Oct. 15, 1940.  R. D. WYCKOFF  2,217,828
SEISMOGRAPH PROSPECTING APPARATUS
Filed July 16, 1937  2 Sheets-Sheet 1
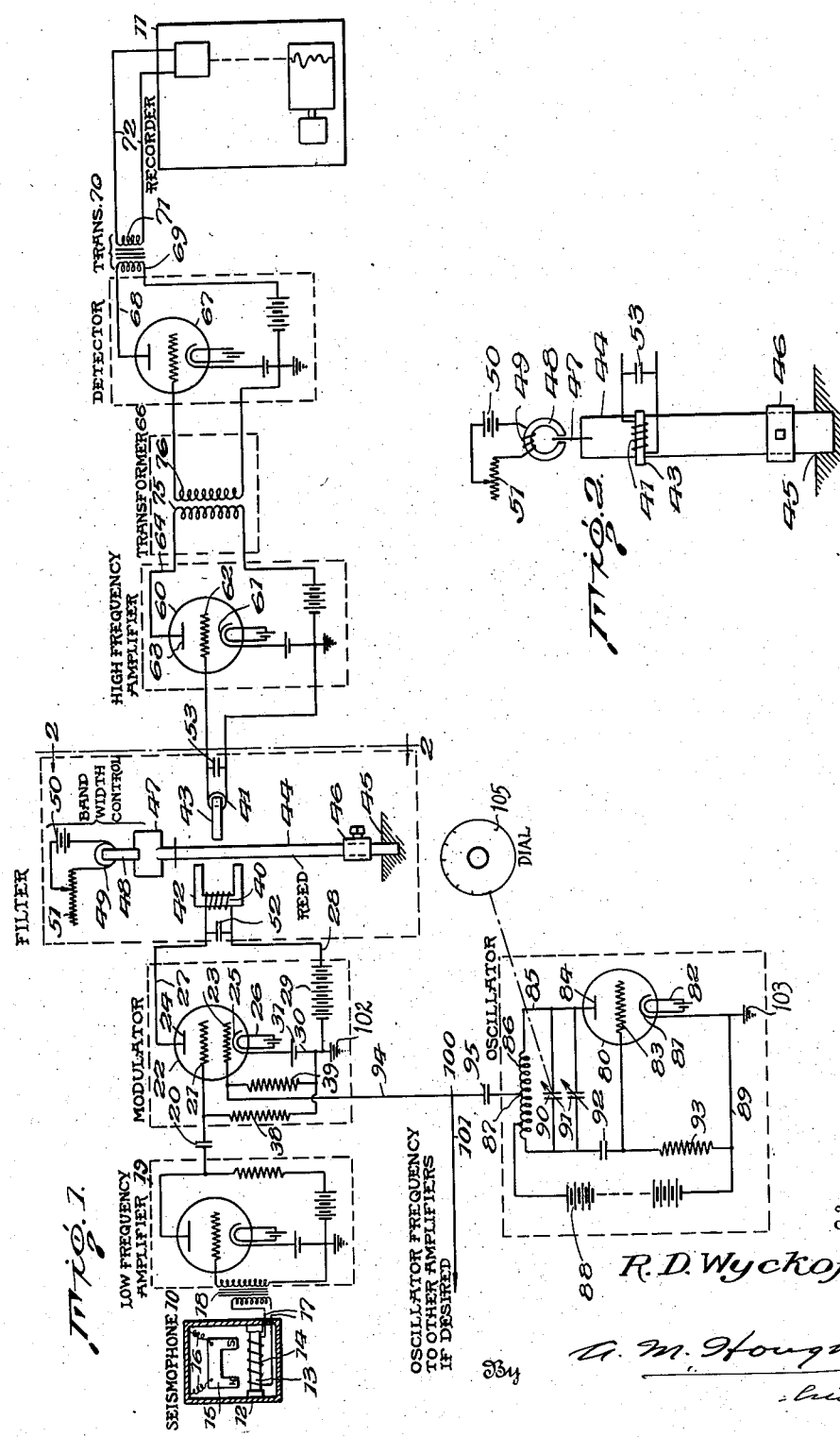
Inventor
R. D. Wyckoff,
G. M. Houghton
By
his Attorney

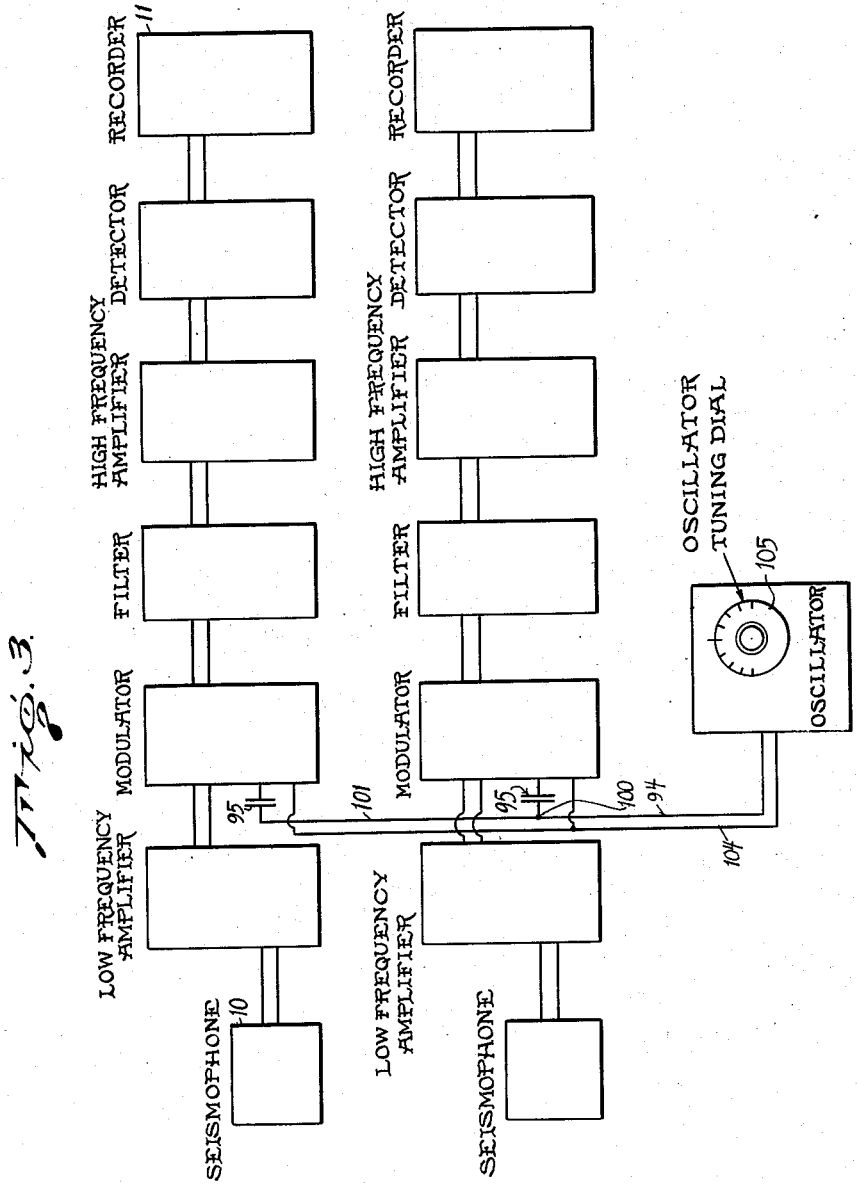

Patented Oct. 15, 1940

2,217,828

UNITED STATES PATENT OFFICE 2,217,828

SEISMOGRAPH PROSPECTING APPARATUS

Ralph D. Wyckoff, Houston, Tex., assignor to Gulf Research & Development Company, Pittsburgh, Pa., a corporation of Delaware Application July 16, 1937, Serial No. 154,068

4 Claims. (Cl. 177—352)

This invention or discovery relates to seismograph prospecting apparatus; and it comprises a circuit for amplifying seismophone signals of varying frequencies, including means for supplying electrical energy of a chosen frequency to the circuit, means for modulating said frequency in response to variations in the input signals, filter means for selecting a part of the side-bands produced by said modulation, amplifying means responsive to said side-bands, and means for adjusting said chosen frequency supplied to the circuit whereby to control the frequency response of the system; all as more fully hereinafter set forth and as claimed.

Seismograph prospecting is a method of securing information as to the geological structure of the earth by creating a small artificial earthquake, which sends out seismic waves through the earth, and observing and recording the waves. The source of the seismic waves is usually an exploding charge of dynamite. The waves travel through the earth and are picked up at one or more seismic detectors or seismophones set up at points spaced from the source. The seismophones develop a current, the voltage of which corresponds to the earth tremors. The seismophone can be arranged to give a voltage proportional to the amplitude, to the velocity or to the acceleration of the earth waves. The output, or signal, is amplified electrically and is applied to a recorder, which is a device adapted to make a continuous record corresponding to the signal from the seismophone. The records are wavy traces which when properly interpreted yield information as to the sub-surface structure of the earth.

In conventional seismograph prospecting, the seismophone, amplifier and recorder are designed to give a more or less direct reproduction of the seismic disturbances received. A strong disturbance is recorded as a wide trace and a weak disturbance as a proportionately narrow trace. Sometimes the amplifier is modified so as to progressively lessen the degree of amplification of stronger signals, in order to secure a clearer record of signals of all strengths.

The received wave is not a single sharp vibration but is a prolonged train of waves. Ordinarily, strong vibration is recorded at the arrival of a wave coming from the shallowest stratum, and then the amplitude of the waves falls off. At various intervals of time the amplitude increases more or less sharply, corresponding to the arrival of waves reflected or refracted from deeper and deeper strata in the earth.

The waves which are of interest are those which have come through deep layers of the earth. But these are not the only waves which are picked up and recorded. Nearby highway traffic or machinery may give rise to disturbing waves. Disturbing waves may also be received which are due to confused refractions and reflections of the explosion wave from shallow boulders, etc. And in addition, minute natural earthquakes are continually occurring in the earth; small seisms due to thermal expansion and contraction, sudden yielding to stresses, etc. These various causes give rise to a sort of static or ground-noise which often obscures the record of the waves which are of interest.

Both the deep waves which are of interest, and the disturbing waves, have definite frequencies or groups of frequencies. It has been found possible to improve the record somewhat by tuning the amplifier so that the desired waves are received under good conditions while the undesired waves are out of tune and are thereby suppressed to some extent. The best tuning frequency is selected arbitrarily to achieve this result. In systems hitherto proposed, ordinary tuning means analogous to those used in radio sets have been employed. While some improvement is effected, the reception of the seismic waves still leaves much to be desired in the way of clarity of record and suppression of ground-noise.

I have now discovered, that by converting seismophone signals to higher frequencies, making use of the heterodyne principle, with an independent, adjustable oscillator, and filtering the high frequency signal with the aid of a very sharp-cut adjustable filter, all prior to recording, I can suppress ground-noise to a remarkable degree, and can also secure the unexpected result of accentuating transients and similar ephemeral signals, with consequent improvement in the record. I have further discovered that a plurality of these amplifiers can be controlled by a master oscillator having a single tuning control, with consequent simplification of apparatus and of operations.

Thus according to the invention I provide one or more tuned amplifier circuits of the heterodyne type in which the oscillating signal from the seismophone is modulated by a continuous high frequency oscillation, and the frequency side bands thereby produced are filtered through a narrow-band filter, advantageously of the mechanical type, and are then amplified, detected and recorded.

In the accompanying drawings I have shown diagrammatically, two examples of specific embodiments of the invention. In the drawings, Fig. 1 is a diagram of an amplifier circuit embodying the invention, Fig. 2 is a view looking in the direction of arrows 2—2 in Fig. 1 showing the filter, and Fig. 3 is a diagram showing how my amplifier may be used for controlling additional amplifiers.

Fig. 1 shows a complete seismograph system including a seismophone 10, a recorder 11 and an amplifier circuit. The seismophone comprises a case 12 adapted to be placed in contact with the earth, containing a fixed iron core 13 with a coil 14 wound thereon and a permanent magnet 15 suspended by spring 16 adjacent the coil. Upon vibration of the earth, the case moves with respect to the permanent magnet and an oscillating current, the voltage of which corresponds to the amplitude of the earth tremors, is developed in a pair of leads 17 from the coil. The seismophone can be arranged to give a signal proportional to velocity, or acceleration of the earth tremors instead of amplitude if desired. The output of the seismophone is supplied to a transformer 18 and a low frequency amplifier tube circuit of conventional form designated generally as 19 and requiring no detailed description.

The low frequency oscillating plate current from amplifier 19 is applied, through a condenser 20, to a grid 21 of a modulator tube 22. The modulator tube contains an additional grid 23, a plate 24, an electron-emitter 25 and a heating filament 26. The plate circuit of the modulator comprises leads 27 and 28, and "B" battery 29, connected to emitter 25 through a lead 30 and a bias battery 31. Resistances 38 and 39 are arranged as shown.

The next element of the circuit is the mechanical filter. It comprises a primary coil 40 and secondary coil 41, wound on similar fixed cores 42 and 43. Between the coils is a vibratory iron reed 44, firmly mounted at one end to a fixed base as at 45. The dimensions, weight and stiffness of the reed determine the frequency of response, in a manner described post. An adjustable slider 46 is provided on the reed for adjusting its vibratory frequency. The reed carries a damping vane 47 of aluminum or like non-magnetic metal which vibrates within the gap of an electromagnet 48 having a coil 49 wound thereon. The coil is energized by a battery 50 controlled by a rheostat 51. This arrangement is for adjusting the width of the frequency band passed by the filter.

Condensers 52 and 53 are connected in parallel with coils 40 and 41 respectively, as shown.

The coils are disposed with their axes at right angles to each other, as shown (Figs. 1 and 2) so that there is no direct coupling between the coils. Fig. 2 is a view of the reed and associated parts, taken at right angles to the view shown in Fig. 1.

This arrangement acts as a filter. Reed 44 carries flux from both coils. It will vibrate when a frequency, equal or substantially equal to its natural or resonant frequency, is applied to coil 40, and it will thereupon induce a voltage of identically equal frequency in coil 41. When the frequency applied to coil 40 is not substantially equal to the natural frequency of the reed, it does not vibrate and no current is induced in coil 41. By adjustment of the rheostat 51, the reed can be damped to varying degrees, and hence the width of the band of frequencies passing the reed filter can be adjusted.

The output of coil 41 is amplified through a high frequency amplifier comprising a tube 60 with electron-emitter 61, grid 62 and plate 63. The plate current from tube 60 is taken through a lead 64 and a transformer 66 to the detector tube 67, arranged in a conventional circuit, and the output of the detector tube is applied through a lead 68 to the input 69 of a transformer 70 whence the amplified signal energy is supplied to the recorder through a secondary 71 and leads 72.

The oscillator comprises a tube 80, having an electron-emitter 81 heated by a filament 82, a grid 83 and a plate 84. The plate circuit of the tube comprises a lead 85, an inductance 86 tapped at 87, a battery 88, and a lead 89 to the electron emitter.

Two variable condensers 90 and 91 are connected in parallel across inductance 86, and the tuning circuit thus formed is connected to grid 83 through a condenser 92, and to lead 89 through the condenser and a resistance 93, as shown. The oscillator is connected to the modulator by a wire 94 joining tap 87 with grid 23, a condenser 95 being interposed as shown.

*Operation*

The operation of the circuit is as follows: Earth vibrations at the seismophone give rise to an oscillating low frequency signal in leads 17, which is amplified at low frequency by amplifier 19 in a known way. The amplified voltage is impressed on grid 21 of the modulator tube. The grid 23 of this tube is supplied with a continuous high frequency voltage, from the oscillator, through lead 94. The tube 22 modulates the high frequency voltage on grid 23, in accordance with the frequency of the signal on grid 21. The output of the modulator tube, which passes through coil 40, therefore contains side-bands corresponding to each input frequency. For example, supposing the signal input frequency range to be from 50 to 200 cycles per second (a range of 150 cycles) and the oscillator frequency to be 1000 cycles, then the two side bands would cover the frequency ranges determined by the sum and difference frequencies or 800–950 cycles and 1050–1200 cycles.

It may be that it is desired to record only frequencies in the 80–100 band of the signal input range. The filter may be adjusted to pass only 900–920 (or 1080–1100) cycles, thereby selecting only the desired side bands while other frequencies are rejected. Such adjustment is made by varying the setting of slider 46 to make the resonant frequency of the reed equal to 910 (or 1090) cycles, and then adjusting rheostat 51 to set the band width at 20 cycles approximately.

The high frequency band thus selected (e. g., 900–920 cycles) is amplified in the high frequency amplifier (tube 60 and its circuit), is detected, that is, demodulated (tube 67) and passed to the recorder through secondary 71 of transformer 70. The amplified signal is recorded in the recorder in a known way. Additional stages of amplification can be added if desired. Carrier energy appears at the detector to reproduce the original modulation frequencies. While the filter 44 may attenuate the carrier energy, with respect to the signal, by a large factor, the carrier voltage at the modulator is so much higher than the signal voltage that nevertheless sufficient carrier voltage reaches the detector for demodulation.

The above illustration is for the purpose of clarity in describing the mode of operation. In practice, the response frequency of the filter, once adjusted is usually held fixed and only the sharpness of response is adjusted to accommodate various band widths as may be desired. Thus, the selection of a particular frequency which it is desired to record is accomplished by adjustment of the oscillator frequency as in conventional heterodyne receptors. Moreover, since the frequency of the filter device is held fixed, the high frequency amplifier which follows operates on a relatively narrow frequency range and may be designed for high gain at the filter frequency.

Further, it is to be noted that the oscillator may operate at radio frequencies and a piezoelectric, magneto-striction or similar filter device in conjunction with a tuned radio frequency amplifier will produce the desired results in the manner above described. Thus, I do not confine the heterodyne method to the use of audio frequency oscillator and filters, the choice of frequency being only a matter of expediency in design.

As stated, in seismograph prospecting it is usual to employ a plurality of seismophones and a plurality of amplifiers, for each shot. Using a plurality of my amplifiers, it is convenient to provide the oscillator in only one of the amplifiers, and to supply the continuous frequency to the other amplifiers, from the oscillator of the first. Fig. 3 shows such a system, with two amplifiers and a master oscillator. Referring to Fig. 1, the oscillator voltage can be tapped off at 100 for this purpose and fed to the modulator of the other amplifier through lead 101. The remaining amplifiers are like that of Fig. 1 except that the oscillator is omitted. With this arrangement frequency selectivity, that is, tuning, is simultaneously controlled in all the amplifiers. In Fig. 1 the modulator is grounded at 102 and the oscillator is grounded at 103, so that these units are connected through ground. In Fig. 3 this ground connection, between the oscillator and the two modulators, is indicated by a wire 104. The oscillator is tuned by a dial 105, advantageously operating one of condensers 90 or 91 (Fig. 1).

Selection of proper tubes and suitable values for the various resistances, capacitances, etc., is within the skill of those versed in the art.

What I claim is:

1. In combination with a recorder, a vacuum tube circuit for amplifying seismophone signals of varying frequencies, means for supplying electrical energy of a chosen frequency to the circuit, means for modulating said frequency according to the variations in said seismophone signals, thereby producing frequency side-bands, means for selecting some of the frequencies in one of said side bands, detecting and recording means in connection with said frequency selecting means, and means for adjusting said chosen frequency whereby to control the frequency response of the circuit.

2. In combination with a recorder, a vacuum tube circuit for amplifying seismophone signals of varying frequencies, means for supplying electrical energy of a chosen frequency, to the circuit, means for adjusting said chosen frequency, means for modulating said frequency according to variations in said seismophone signals, thereby producing frequency side bands, and means for selecting some of the frequencies in one of said side bands, said means comprising a mechanically vibrating element having a definite resonant vibratory frequency, means for causing vibrations of said element when the selected side band frequency substantially coincides with the resonant frequency of the vibratory element, and detecting and amplifying means arranged to be energized by the vibration of said element, and connected to the recorder.

3. The matter of claim 2 wherein means are provided for damping the vibrations of said vibratory element, whereby to broaden the resonant frequency into a range of frequencies.

4. In a seismograph system, a plurality of seismophones giving signals of varying frequencies, some of which it is desired to record, an amplifier circuit for each seismophone, each amplifier circuit including a modulator for mixing the seismophone signals with a high frequency signal to produce side-bands, and pre-adjusted filter means for selecting a range of frequencies in one of said side bands, an oscillator so constructed and arranged as to supply a high frequency signal to all said modulators, and means for adjusting said oscillator to vary the frequency of said high frequency signal, whereby the tuning of all the amplifier circuits is simultaneously adjusted by said oscillator adjustment for optimum reception of the desired frequencies.

RALPH D. WYCKOFF.